United States Patent

Rhodes

[11] 4,137,648
[45] Feb. 6, 1979

[54] DRIERS FOR TEXTILE MATERIALS
[75] Inventor: Eric S. Rhodes, Harrogate, England
[73] Assignee: E. Gordon Whiteley Limited, Morley, England
[21] Appl. No.: 788,667
[22] Filed: Apr. 18, 1977
[30] Foreign Application Priority Data
Apr. 26, 1976 [GB] United Kingdom ............... 16860/76
[51] Int. Cl.² .............................................. F26B 13/02
[52] U.S. Cl. ............................................ 34/86; 34/51;
34/158; 34/212; 432/145; 432/172
[58] Field of Search .................. 34/86, 216, 217, 225,
34/35, 212, 224, 158, 51; 60/39.33, 39.5, 39.02;
432/143-145, 172, 222, 59

[56] References Cited
U.S. PATENT DOCUMENTS

| | | | |
|---|---|---|---|
| 1,461,224 | 7/1923 | Pearson | 432/144 |
| 2,547,093 | 4/1951 | Ray | 60/41 |
| 3,004,347 | 10/1961 | Dobson | 34/86 |
| 3,100,632 | 8/1963 | Mohring | 432/145 |
| 3,371,428 | 3/1968 | Thygeson, Sr. et al. | 34/212 |
| 3,997,317 | 12/1976 | Dicks | 432/145 |

Primary Examiner—John J. Camby
Assistant Examiner—Larry I. Schwartz
Attorney, Agent, or Firm—Watson, Cole, Grindle & Watson

[57] ABSTRACT

A machine for drying textile materials, which comprises a casing, electrically driven means for feeding the textile material through the casing, electrically driven means for circulating hot gas within the casing, a gas turbine engine, an alternator driven by the gas turbine engine and providing electrical power for said feeding and circulating means and trunking for feeding the exhaust gas of the gas turbine engine into the interior of the casing.

3 Claims, 9 Drawing Figures

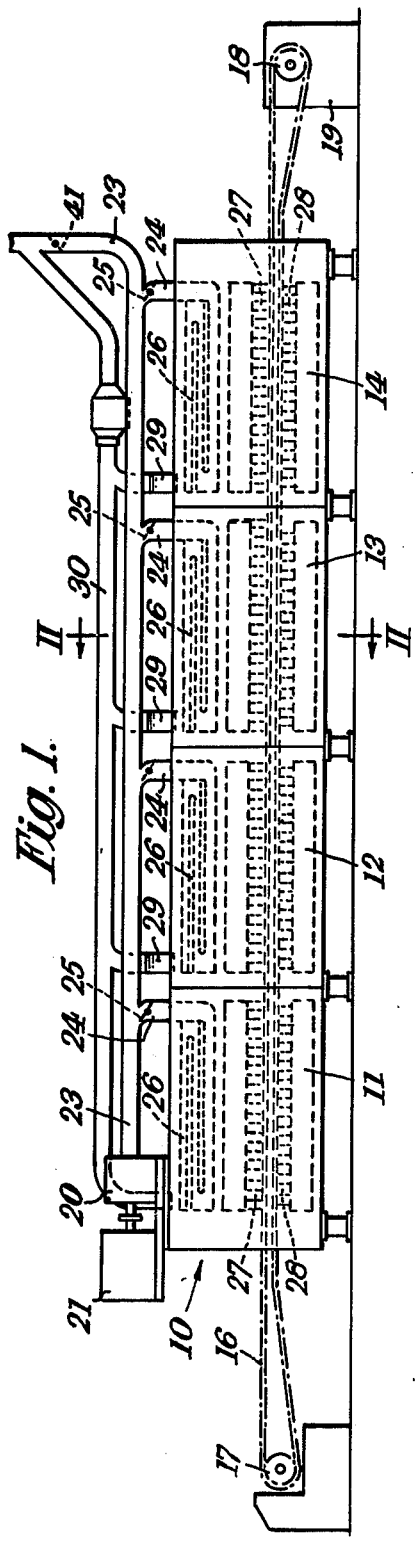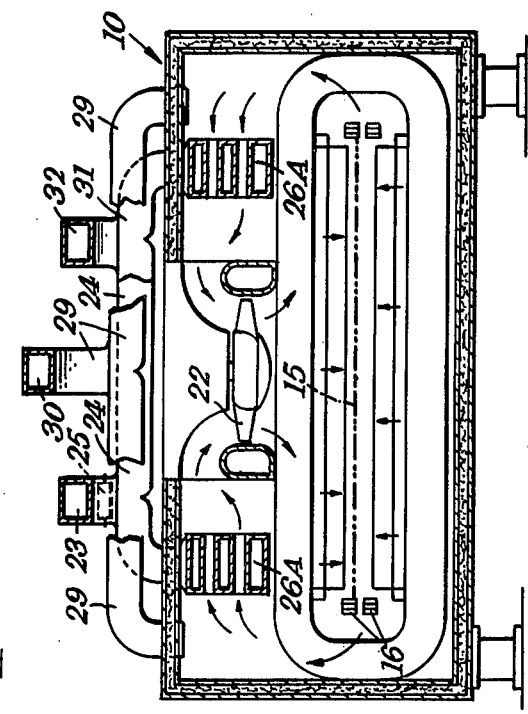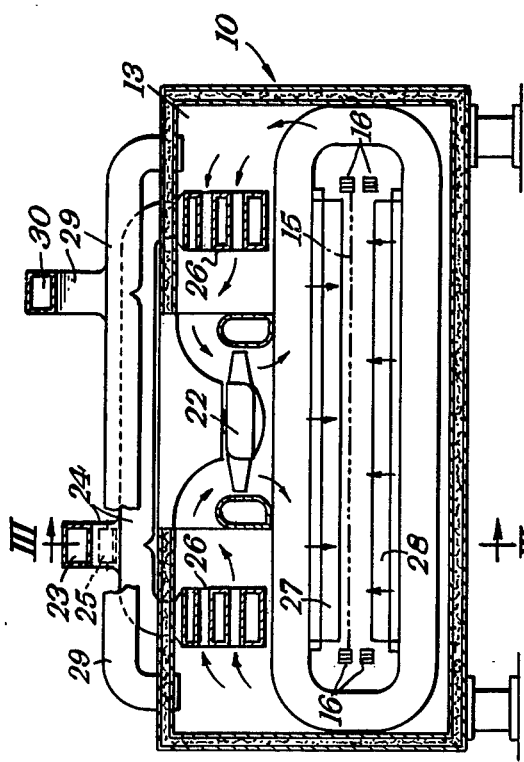

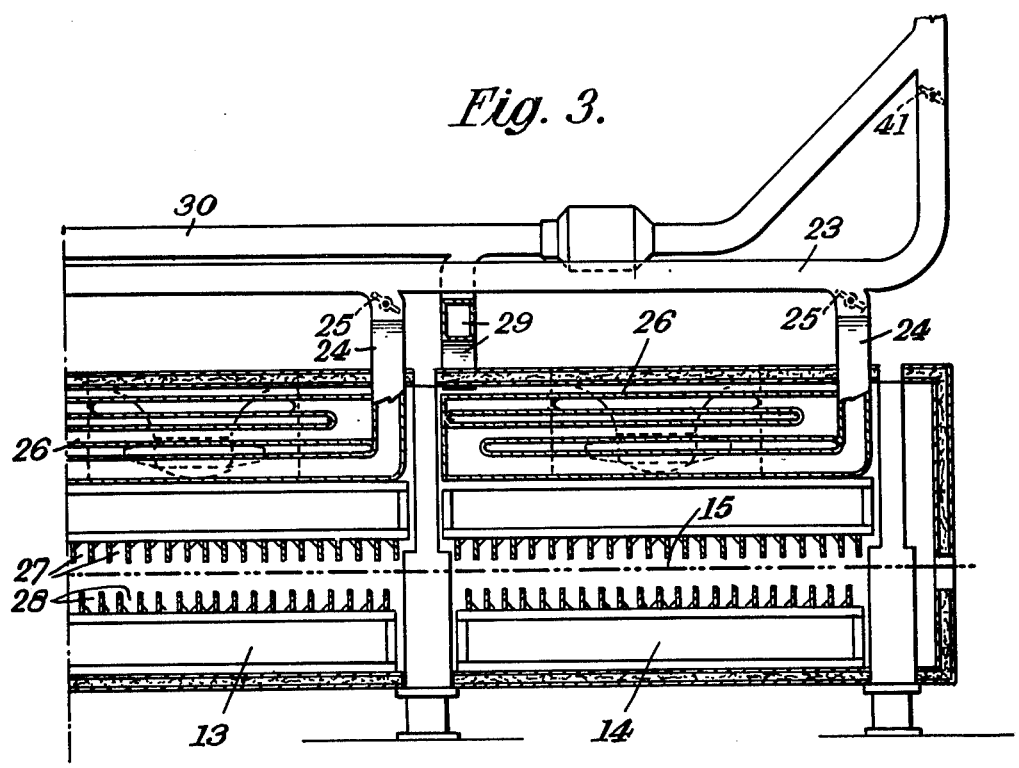
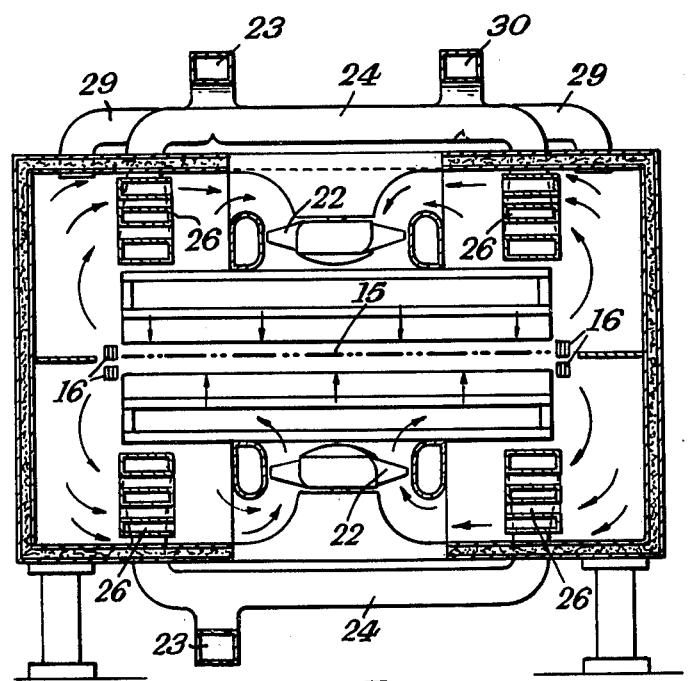

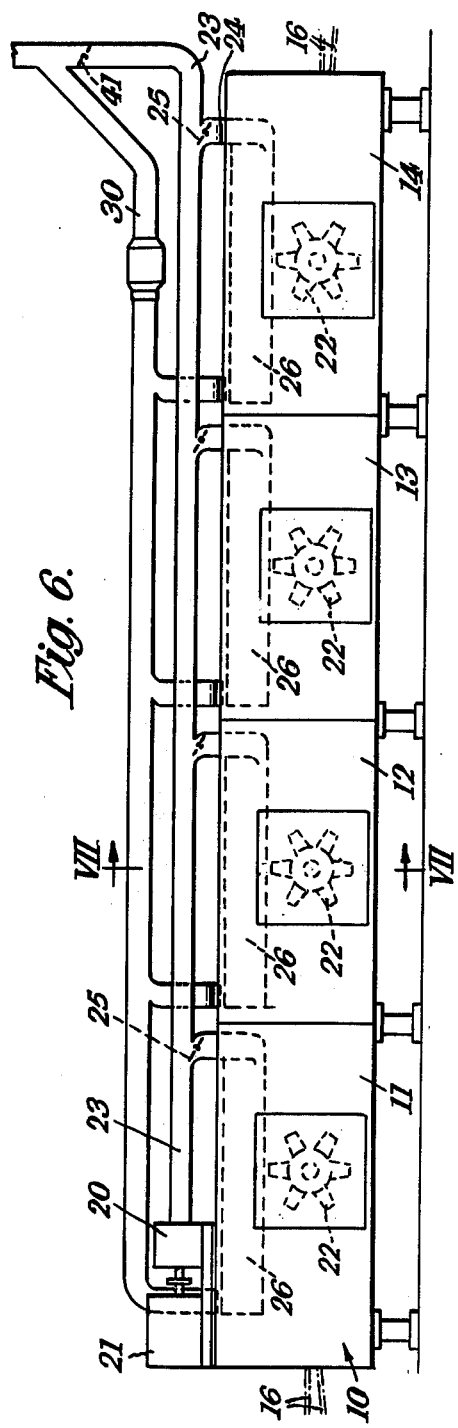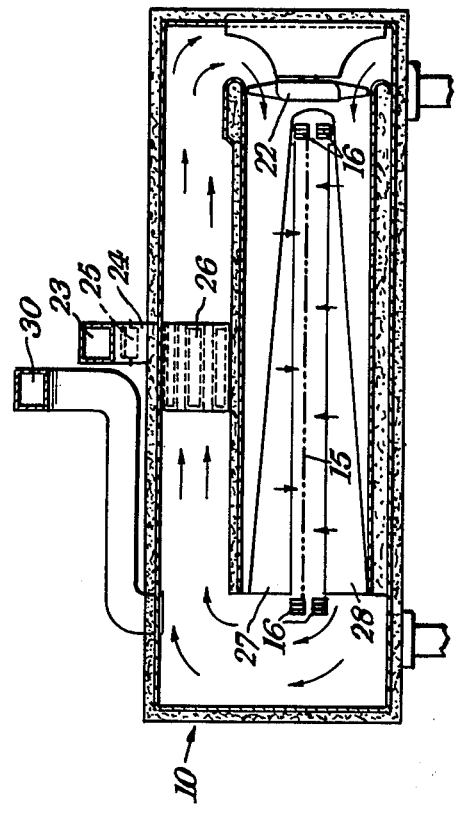

DRIERS FOR TEXTILE MATERIALS

At present a stenter is provided with electric motors, powered from the mains, for operating the mechanism for traversing cloth through the machine and operating air circulating fans and with gas, oil or other burners for imparting the necessary heat to the air. The same is true of other driers for textile materials, including raw stock driers, cloth driers, carpet driers and machines for curing or ageing backings of latex or rubber applied to carpets. This procedure is wasteful in its consumption of energy.

The object of the present invention is to provide a more efficient drying machine for textile materials. The invention accordingly provides a machine for drying textile materials, which comprises a casing, electrically driven means for feeding the textile material through the casing, electrically driven means for circulating hot gas within the casing, a gas turbine engine, an alternator driven by the gas turbine engine and providing electrical power for said feeding and circulating means and trunking for feeding the exhaust gas of the gas turbine engine into the interior of the casing.

Figure 8:
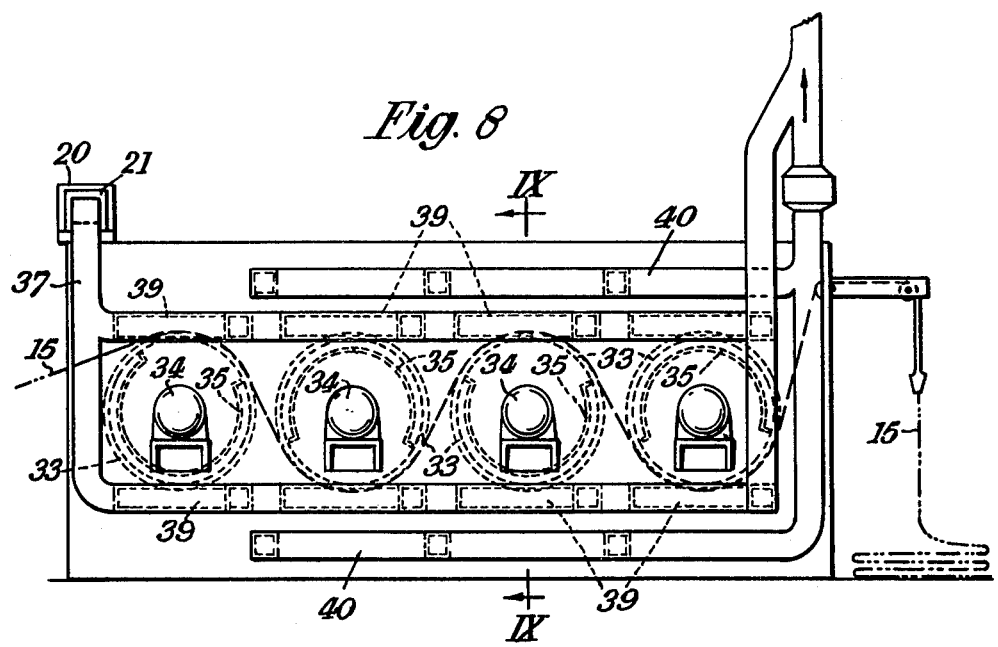
Figure 9:
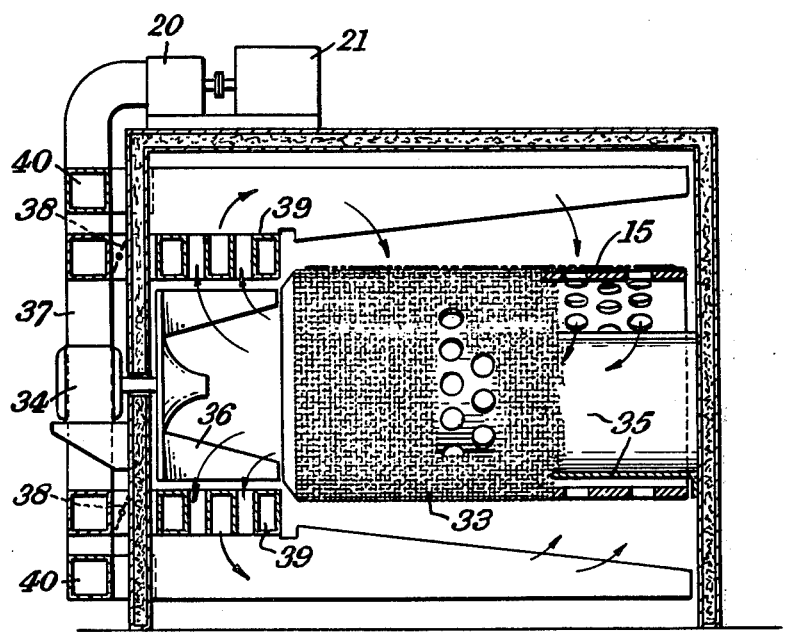

Certain embodiments of the invention will now be described in more detail, by way of example, with reference to the accompanying drawings, in which:

FIG. 1 is an elevation showing a stenter,
FIG. 2 is a section on the line II—II in FIG. 1,
FIG. 3 is a section on the line III—III in FIG. 2,
FIG. 4 is a view, similar to that in FIG. 2, illustrating a modified form of stenter,
FIG. 5 is a view, similar to that in FIG. 2, illustrating a further modification,
FIG. 6 is a view, similar to that in FIG. 1, illustrating another embodiment of stenter,
FIG. 7 is a section on the line VII—VII in FIG. 6,
FIG. 8 is an elevation showing a drum drier, and
FIG. 9 is a section on the line IX—IX in FIG. 8.

Like reference numerals designate like parts throughout the Figures.

The stentor 10 shown in FIGS. 1-3 includes a series of chambers 11, 12, 13 and 14, through which cloth 15 to be dried is traversed in succession by a pair of spaced parallel chains 16 having projections (not shown) for engaging the cloth. The chains 16 run over end sprockets 17, 18; the sprockets 18 being driven by an electric motor 19.

A gas turbine engine 20 drives an alternator 21, which provides electrical power for the motor 19 and a series of axial flow fans 22, one of which is disposed in each of the chambers 11-14. The exhaust gas from the engine 20 provides the heat required for drying the cloth as will now be described.

The exhaust gas is supplied to trunking 23 which extends along the machine in a direction parallel to the direction of travel of the cloth 15 and thence to spaced inlet passages 24, which extend downwardly into the individual chambers 11-14. Each passage 24 is controlled by a butterfly valve 25, which may be controlled manually or automatically to maintain the temperatures in the individual chambers at desired values.

Each chamber contains heat exchangers 26, disposed on opposite sides of the fan 22 and from which the hot exhaust gas, after cooling by interchange of heat with gases recirculating in the chamber and atmospheric air drawn into the machine at its ends, emerges into the chamber. The partially cooled gas flows in each chamber as indicated by the arrows in FIG. 2 and impinges on the cloth 15 through relatively staggered upper and lower nozzles 27, 28. The gas flows out through outlet pipes 29 to exhaust trunking 30.

An exhaust butterfly valve 41 is provided at an outlet to atmosphere at the end of the trunking 23 to control and maintain a back pressure in the stenter and a temperature-and pressure- responsive mechanism places this valve in the proper position to maintain the correct conditions for treatment of the cloth and to maintain the exhaust of gas from the machine in balance with the intake.

In a typical case, the heat exchangers 26 serve to cool gas in the trunking 23 at a temperature of the order of 800° C. to a temperature of the order of 100°-240° C. before it impinges on the cloth.

In the modification shown in FIG. 4, the cloth is not subjected to direct heating by the exhaust gas of the turbine but indirect heat exchangers 26A are used in place of direct heat exchangers. The exhaust gas passes direct from these to exhaust ducts 31 and exhaust trunking 32. The cloth 15 is heated by atmospheric air and recirculating gas to which heat is imparted by the heat exchangers and is accordingly not exposed to the action of the exhaust gas.

In the modification shown in FIG. 5, each chamber contains two axial flow fans 22, disposed respectively above and below the cloth 15 and each flanked by a pair of direct heat exchangers 26 to which the exhaust gas is supplied through trunking 23. Otherwise the construction is as in FIGS. 1-3.

The stenter shown in FIGS. 6 and 7 is generally similar to that shown in FIGS. 1-3 but it is side blown. Each chamber contains a laterally disposed axial flow fan 22 and a single direct heat exchanger 26.

A stenter according to the invention utilizes the energy available from a gas turbine engine to the best advantage. The prime cost does not greatly exceed that of a conventional stenter and the running costs are reduced by some 30%, since the heating costs are no more and no electricity from the mains is consumed.

The suction drum drier shown in FIGS. 8 and 9 includes four perforated drums 33, each of which contains an imperforate stationary baffle 35. Air is sucked from each drum by a fan 36 driven by a motor 34. As in the case of the stenter, a gas turbine engine 20 drives an alternator 21 which supplies the electrical power to the motors 34 for driving the fans 36. The exhaust gas from the turbine passes through ducting 37 containing a butterfly valve 38 to a direct heat exchanger 39, similar to that shown in FIGS. 1-3, and thence to the interior of the drier and the gas emerges from the drier through ducting 40.

The cloth 15 to be dried passes in serpentine fashion, as shown in FIG. 8, over the portions of the drums 33 which are unmasked by the baffles 35, and is dried by the combined action of the suction within the drums and the heat imparted to it by the hot gas in the drier. The cloth is drawn through the drier by means (not shown) powered by the alternator.

What I claim as my invention and desire to secure by Letters Patent is:

1. A stenter for drying textile materials, comprising a casing having successive chambers therein, chains for feeding the material to be dried through said successive chambers in the casing, an electric motor connected to drive the chains, a gas turbine engine, trunking for feeding exhaust gas from said gas turbine engine into said casing, an electrically driven fan in each said chamber for circulating hot gas within the casing, an alternator driven by said gas turbine engine and providing electrical power for said electric motor and said fans, a heat exchanger in each said chamber, passages connecting said heat exchangers to the trunking, valves in said passages for controlling the temperatures in said chambers, an outlet for exhaust gas from said trunking and a valve controlling said outlet for maintaining a back pressure in said casing.

2. The stenter according to claim 1, in which said heat exchangers are direct heat exchangers wherein the exhaust gas is cooled, prior to impingement on the material to be dried, by air drawn from the atmosphere and by gas recirculating in said chambers.

3. The stenter according to claim 1, in which said heat exchangers are indirect heat exchangers having outlets for the exhaust gas to said trunking, said material being dried by impingement thereon of air and recirculating gas heated by passage over said heat exchangers.

* * * * *